UNITED STATES PATENT OFFICE.

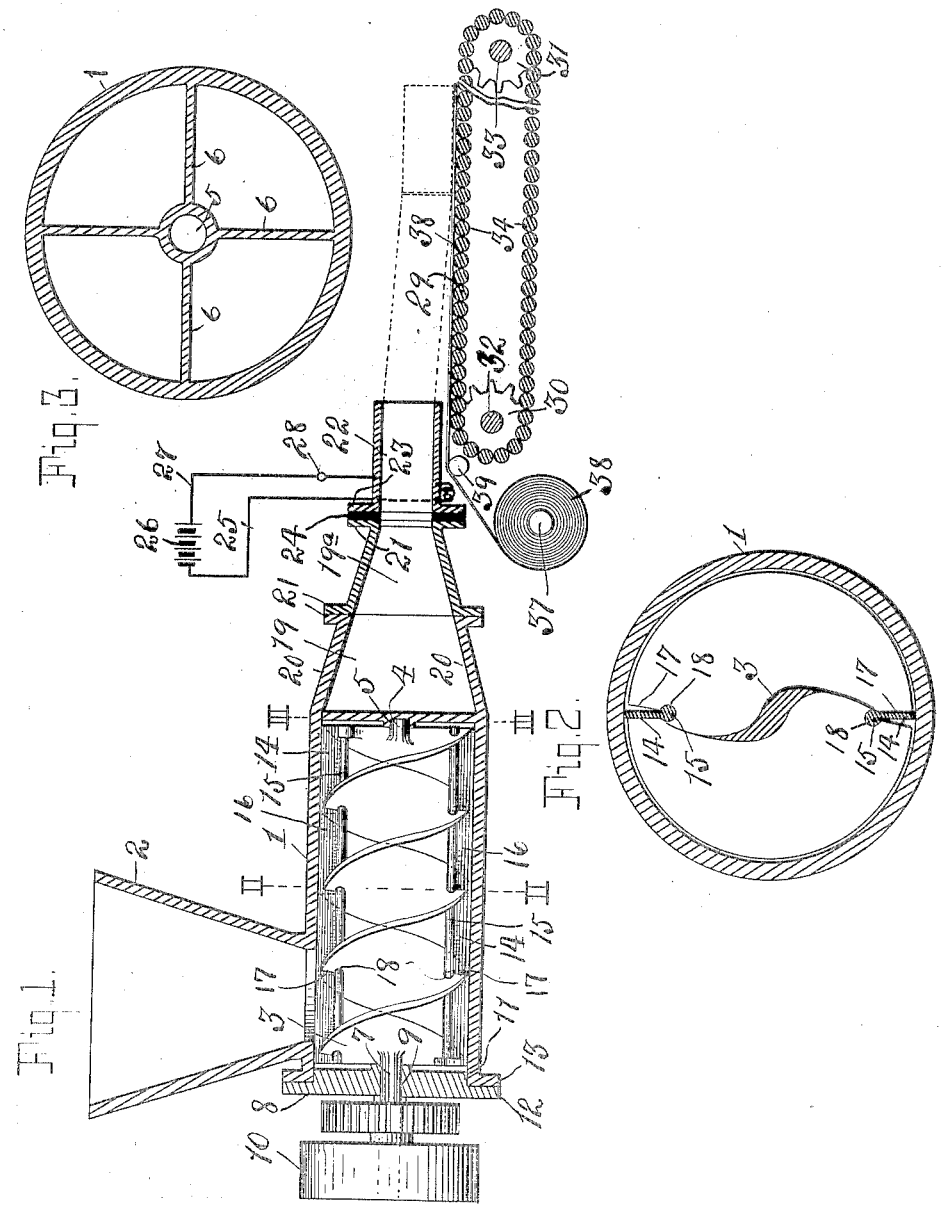

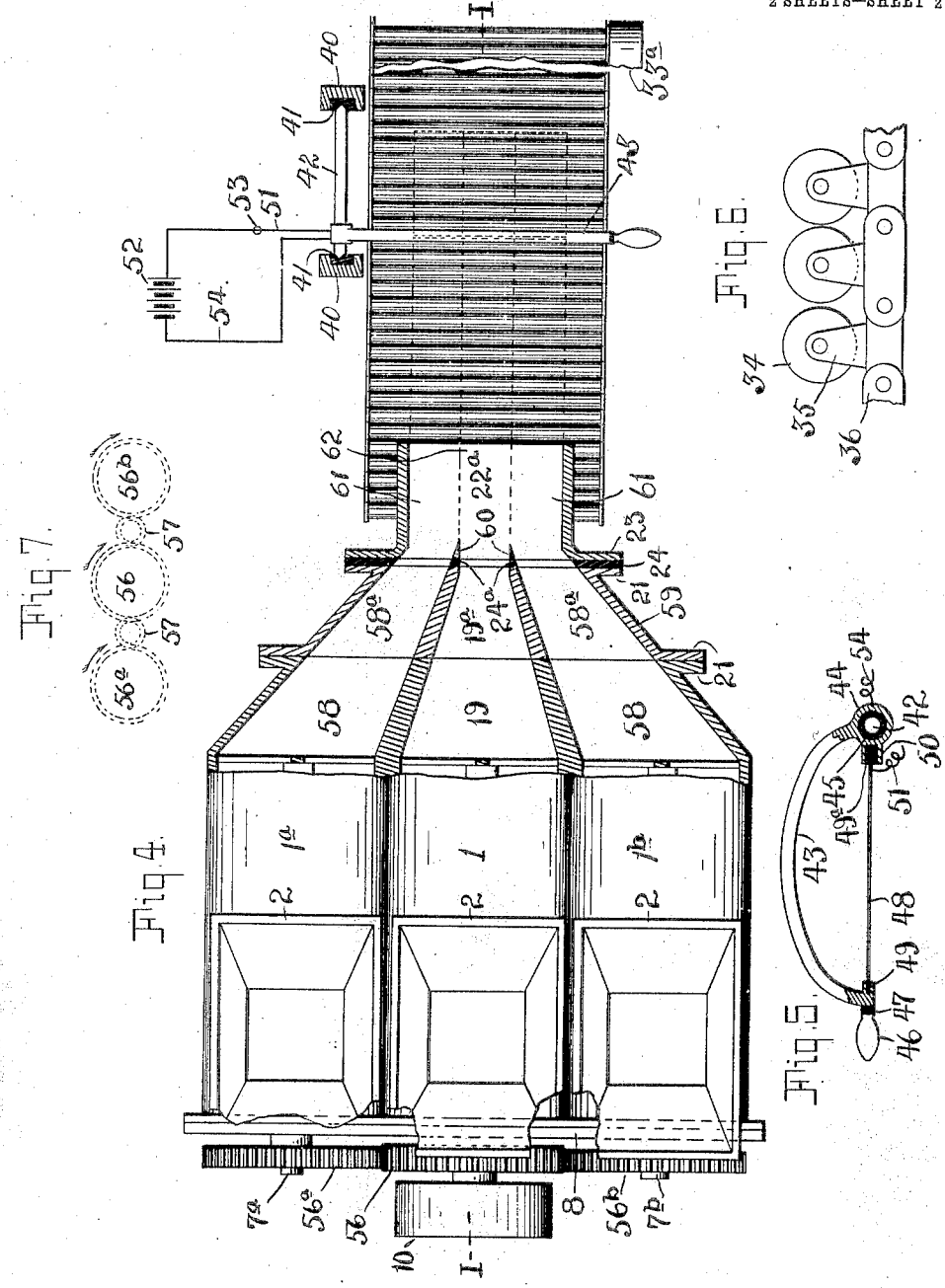

JOHN J. GLAUSER, OF PITTSBURG, PENNSYLVANIA, ASSIGNOR TO THE EDWARD E. RIECK COMPANY, OF PITTSBURG, PENNSYLVANIA, A CORPORATION.

ICE-CREAM MACHINE.

No. 797,276.   Specification of Letters Patent.   Patented Aug. 15, 1905.

Application filed May 16, 1904. Serial No. 208,110.

*To all whom it may concern:*

Be it known that I, JOHN J. GLAUSER, a citizen of the United States, residing at the city of Pittsburg, in the county of Allegheny and State of Pennsylvania, have invented or discovered new and useful Improvements in Ice-Cream Machines, of which the following is a specification.

In the accompanying drawings, Figure 1 is a vertical section of my invention along the line I I in Fig. 4, certain portions being shown in full and the severing mechanism being omitted for the sake of clearness. Fig. 2 is a vertical section along the line II II in Fig. 1. Fig. 3 is a like view along the line III III in Fig. 1. Fig. 4 is a plan view of my mechanism adapted to produce shapes or forms of frozen products in layers of different color or flavor, the hoppers being partially in section and the forming-chambers and severing mechanism being in horizontal section. Fig. 5 is an elevation of the shearing mechanism, partly in section, to show insulation. Fig. 6 is a detail of a portion of the carrier, and Fig. 7 is a diagram showing a modification of the arrangement of the driving-gears.

My invention, briefly stated, consists in novel and useful mechanism for the manufacture of shapes and forms from frozen products, such as ice-cream and other foods; and it consists generally of means for rapidly molding a frozen mass into rectangular or other desired form and the cutting of the same into convenient sizes for delivery or use.

My invention is especially adapted to forming shapes from materials of various color or flavor to be united in the form of layers and enables the layers to be produced of even size and united without intermingling or crushing together, thus presenting a much better appearance than such composite mass as now manufactured in the old ways. By means of my novel mouthpiece and forming-chambers I am enabled to produce a form or shape having smooth even faces, and my improved severing means produces a cut surface, likewise smooth and even, thus producing a finished form of pleasing appearance.

In the accompanying drawings, which are, however, merely illustrative of the principles of my invention and not intended to limit the scope thereof to the exact mechanism shown, 1 is a horizontal cylinder, which may be constructed of any suitable material; but I prefer to use galvanized or tinned metal, as the same is of great strength and easily cleansed.

2 is a hopper of any usual type opening downwardly into the cylinder 1 near its rear. 3 is a spiral web occupying the bore of said cylinder and adapted to be rotated therein.

4 is a pivot-boss rigidly fixed to the center of the forward end of the spiral web 3 and adapted to be journaled in aperture 5, formed at the intersection of the cross-ribs 6 6, (shown clearly in Fig. 3,) which are located in the forward extremity of cylinder 1.

7 is a shaft rigidly attached to the center of the rear end of spiral 3.

8 is a cover adapted to close the rear end of cylinder 1, through an aperture 9 in the center of which extends said shaft 7, said aperture acting as a journal for said shaft.

10 is a band-wheel or pulley adapted to be firmly seated, preferably in a removable manner, on the outer end of shaft 7, so that by its revolution shaft 7, and with it spiral 3, is rotated at will.

The cover 8 is of reduced diameter, as at 11, to enter the bore of cylinder 1 for a short distance and is also provided with peripheral lip 12, which abuts against the flange 13, integral with said cylinder and to which it may be attached by any convenient means, as by connecting-bolts. (Not shown.) It is evident that by loosening the cover 8 the spiral 3 may be withdrawn from the cylinder 1 for cleansing.

14 14 are horizontal paddles consisting of a pivot-rod 15 and a fin or blade 16, integral therewith or firmly attached thereto. The spiral web 3 is slotted at its edges, as shown, along two or more horizontal lines, dependent on the number of paddles to be provided. I have shown but two paddles in the drawings; but any desired number may be used. These slots 17 17 form seats for the paddles 14 14 and have circular enlargements at their bases 18 18 of sufficient size to accommodate the pivot-rods 15 15 of the paddles. The paddles are seated by being pushed in place horizontally into the seats 17 17. By making these seats to flare outwardly somewhat, as shown in Fig. 2, I provide the paddle-blades with a certain freedom of movement in the nature of a rotation on their pivot-rods 15 15 through a short arc. At the forward end of said cylinder I prolong the walls thereof into a gradually contracting or reducing chamber 19, having a cross-sectional shape conforming near its forward end to the contour of the shape or form of the product to be produced. This shape is usually rectangular; but any desired cross-sectional contour may be effected by altering the shape of the reducing-chamber.

20 20 are the walls of chamber 19.

To enable the machine to produce smaller shapes or forms than those which would be produced by the chamber 19, I provide additional sections 19$^a$, which may be added at will, and further reduce the size of the product eventually discharged. It will be understood that additional chambers 19$^a$ may be added, still further reducing the size of the final product discharged, as the particular requirements dictate. Thus for gallon shapes I might use simply the chamber 19, with the mouthpiece to be described added; but when quart shapes are to be produced I would add chamber 19$^a$, and, further, in case pint shapes are to be produced I would add still a second chamber 19$^a$ of further reducing capacity to the mouth of the above-described chamber 19$^a$, and so on as still smaller shapes are to be produced. The chamber 19$^a$ may be attached to chamber 19 and to each other by means of bolts or other devices (not shown) attaching together the abutting circumferential flanges 21 21.

22 is a mouthpiece to be attached either to the discharge end of chamber 19, which acts as a molding-chamber to impart the final form to the product, or in case additional chamber or chambers 19$^a$ are added to the discharge end of the last chamber 19$^a$, the size of said mouthpiece varying accordingly. I prefer to secure said mouthpiece by means of its flange 23 to the adjacent flange 21 of the reducing-chamber, interposing, however, between the flanges the insulating material 24 24 of any suitable character, thereby effectually insulating said mouthpiece from the remainder of the apparatus. 25 is a wire attached to one side of said mouthpiece 22 and leading to battery or other suitable source of electric current 26. 27 is a return-wire, preferably provided with a switch 28, leading from the battery to the other side of mouthpiece 22. It is evident that if mouthpiece 22 be made of metal which is of relatively high resistance to the passage of an electric current I may heat said mouthpiece by completing the above-described circuit. By thus raising the temperature of the mouthpiece I am enabled to slightly melt the surface of the frozen mass being forced through the same, thus expediting its passage and smoothing and finishing its surfaces, thus producing a shape or form of pleasing appearance.

29 is an endless conveyer of any convenient length and so located as to receive the mass of frozen product being discharged from mouthpiece 22 and leading the same away therefrom, it being understood that the movement of the conveyer is at the same rate at which the product is being discharged from said mouthpiece. Said conveyer consists generally of two pairs of sprocket-wheels 30 30 and 31 31, mounted, respectively, on horizontal shafts 32 and 33, one of said shafts being power-driven, as by means of bandwheel or pulley 33$^a$.

34 34 are the horizontal carrying-rollers, journaled at each end to the projections 35 35, rigidly attached to the links of the sprocket-chains 36 36, which engage said sprocket-chains.

37 is a roller journaled in stationary bearings (not shown) and having coiled thereon a roll of suitable wrapping-paper 38.

39 is a guide-roller, also suitably journaled in bearings (not shown) somewhat in advance of carrier 29, over which the paper 38 is led and laid on top of carrier 29. Said paper is preferably of greater width than the forms or shapes to be enwrapped therein, so as to be folded up laterally around the same, and is also transversely perforated in the proper length for said forms or shapes.

40 40 are fixed pivot members, preferably provided with insulating-blocks 41 41.

42 is a rock-shaft, preferably having conical ends journaled in blocks 41 41, as shown in Fig. 4.

43 is an arched arm having integral therewith and attached thereto a collar 44, encircling rock-shaft 42 and fixed to said rock-shaft by means of interposed insulating ring or collar 45.

46 is a handle attached to the free end of arm 43, but having insulating-block 47 interposed between the same.

48 is a cutting wire or member attached to the free end of arm 43, as by means of an aperture in projection 49, integral with said arm, and at its inner extremity to insulating-block 49$^a$, seated in hollow boss 50, integral with the base of arm 43. To cutting member 48 at its inner extremity I preferably attach wire 51, which runs to electric battery 52 or other suitable means for electrical supply, said wire 51 having preferably interposed in its length a suitable switch 53 for completing or breaking the circuit at will. From the other pole of the battery 52 runs a second wire 54, connecting with the base of the arm 43, thus completing an electrical circuit through cutting member 48 when switch 53 is closed. It is evident that by depressing handle 46 the cutting member is caused to swing down onto rollers 34 34, thus severing transversely the shape or form of product carried by the conveyer 29 into desired sections. I may form cutting member 48 either out of wire, or it may be a knife-blade, as desired. By interposing said cutting member in an electric circuit I am by making said member of relatively high resisting material enabled to raise its temperature, so that it readily slices the frozen product transversely, leaving a smooth even line of severance.

It is frequently desirable to produce a form or shape of frozen products, such as ice-cream, wherein the finished product is composed of a plurality of layers of varying color or flavor. To adapt my machine to this purpose, I provide a plurality of (in this case three) cylinders 1, 1$^a$, and 1$^b$, as shown in Fig. 4. These cylinders are placed side by side and rigidly attached together or preferably made integral, as shown in Fig. 4. The band-wheel 10 is in such case mounted on the projecting end of shaft 7 of one of the cylinders, preferably the center cylinder 1, as shown in Fig. 4. On said shaft is also rigidly mounted gear 56, which meshes with corresponding gears 56$^a$ and 56$^b$ on the shafts 7$^a$ and 7$^b$ of the other cylinders, respectively. It is thus evident that by applying power to pulley 10 the shaft of the cylinders 1, 1$^a$, and 1$^b$ would be rotated, rotating with them the corresponding spiral webs, the shafts 7$^a$ and 7$^b$ rotating in the opposite direction to shaft 7. If it be desired to rotate all the shafts in the same direction, I prefer to reduce somewhat the diameter of gears 56, 56$^a$, and 56$^b$ to allow for the interposition of idlers 57, as shown in the diagram in Fig. 7, thus reversing the transmitted motion of gear 56 and rotating gears 56$^a$ and 56$^b$ in the same direction as gear 56 and pulley 10. The reducing-chamber 19 of the cylinder 1 in Fig. 4 is similar in internal contour to the corresponding chamber in Fig. 1. The reducing-chambers 58 58 of cylinders 1$^a$ and 1$^b$ are preferably formed so as not only to gradually assume the desired rectangular or the cross-sectional shape of the layer being formed therein, but, as shown in Fig. 4, to give their contents an inward direction, so that the same would be discharged into lateral contact with the product discharged from the central chamber 19. The reducing-chambers 19, 58, and 58 may be added to and their contents further reduced in cross-section by the addition of a further reducing-section 59, fitted with chambers 19$^a$, 58$^a$, and 58$^b$, registering with chambers 19, 58, and 58, said section being attached by means of the flanges 21 21, as above described. It is evident that in case of further reduction in size being desirable further reducing-sections may be added to said section 59.

22$^a$ is the mouthpiece or molding-chamber of proper size to fit on the discharge end of the reducing-chambers 19, 58, and 58 of the three cylinders or the additional reducing-section 59, as the case may be. A similar insulated connection as that shown in Fig. 1 is made use of. 60 60 are short wedge-shaped partitions in said mouthpiece 22$^a$, extending from top to bottom and registering with the partitions between chambers 19, 58, and 58 or the corresponding partitions in section 59, as the case may be.

24$^a$ 24$^a$ represent insulating material which, with insulation 24 24, entirely insulates the mouthpiece 22$^a$ from the remainder of the apparatus.

The electrical connections of the mouthpiece are preferably the same as those shown in connection with mouthpiece 22 in Fig. 1. The carrier and cutting mechanism are also preferably the same.

The operation of my single-cylinder machine is as follows: Power is applied to pulley 10 to rotate the spiral web 3 in the proper direction and at the desired speed. Ice-cream or whatever other product is to be worked is fed into hopper 2 and passing down into cylinder 1 is forced forward by means of spiral web 3 into chamber 19 and thence by the pressure of material behind the same through mouthpiece 22, wherein it receives the desired final cross-sectional form. The mouthpiece being heated by the electrical means shown or in any other convenient manner not only expedites the molding and passage of the product, but by contact with its sides gives its faces a smooth even surface. The product as it is forced out of mouthpiece 22 is carried along on paper 38, laid on carrier 29. When the desired amount of product has passed beyond the plane of movement of the arm 43, the said arm is depressed, the cutting member 48 slicing through and severing the product. The heated state of the cutting member 48 produces a smooth even surface of severance. The wrapping-paper 38 is then folded up laterally over the severed section of product and detached from the adjacent paper by means of perforations (not shown) arranged to register with the line of severance of the product. The severed section is now removed. It is evident that this process of cutting the product into convenient sizes as it leaves the mouthpiece 22 may be continued as long as the product is fed into and forced out of cylinder 1 through the reducing-chamber and mouthpiece. The paddles 14 14, carried by the spiral web 3, serve to scrape the interior walls of the cylinder 1 and prevent clogging of the material. Their power of rotating somewhat on their pivot-rods 15 15 enables the rods to trail slightly, and thus reduces their friction against the cylinder-walls and facilitates their removal from the spiral. The cutting-arm 43 is preferably depressed at the proper intervals to slice the product into the desired lengths, or I may provide any desired number of cutting members 48, mounted on a frame (not shown) so as to act together, so that any section of any desired number and lengths may be cut at one and the same operation.

Where the finished form or shape of ice-cream or other product is to be made up of a plurality of layers of material of varying color or flavor, or both, I use a plurality of cylinders combined into a mechanism such as illustrated in Fig. 4. The different materials are each fed into the proper cylinders 1, 1ª, or 1ᵇ through its respective hopper, whence they pass into the chambers 19, 58 and 58, and thence, if additional section or sections 59 are added, into chambers 19ª, 58ª, and 58ª, whence they pass into the mouthpiece 22ª. The horizontal inward slant of the chambers 58 and 58 directs their product 61 61 (shown in dotted lines) toward the product 62 (also shown in dotted lines) discharging from the chamber 19. The wedge-shaped partitions 60 60 being heated by the passage of the electric current slightly melt the opposing walls of the layers 61, 62, and 61, so that when they meet in the forward part of mouthpiece 22ª they readily unite in an integral shape or form wherein the layers are perfectly joined together, but present clear straight lines of demarcation. The fact that the mouthpiece 22ª is heated by the electrical current enables the walls thereof to produce in the finished shape or form a smooth even surface. The action of carrier and cutting mechanism is in both cases the same.

By assembling the required necessary number of cylinders with their reducing-chambers and arranging that their products shall be discharged in such a manner as to be firmly united together in the form of layers a form or shape of any desired number of layers may be produced.

The mechanism shown in Fig. 4 may be used to produce but a single layer only by using the central cylinder 1, or the central and one side cylinder, such as 1ª, may be used to produce a two-layer product, if desired, the vacant portion of mouthpiece 22ª being shut off by any convenient means (not shown) to keep the product in alinement with the carrier.

I have shown electrical connections for heating the mouthpieces and severing member as the most convenient; but any practical method of heating the same may be substituted.

I have described my invention as applied more particularly to ice-cream working; but its applications to the working of other products is apparent, and I desire to include within the invention its application to the various uses to which it may be put.

Many alterations in the above-described mechanism, including changes of details and parts, will suggest themselves to those skilled in the art; but I regard the same as contained within the scope of my invention and desire to claim, broadly, 1. In apparatus for molding frozen products, a chamber for the reception of said products, a spiral web adapted to be rotated within said chamber to discharge the contents therefrom, a reducing-chamber communicating with said first-mentioned chamber to receive the contents thereof, a molding-chamber communicating with said reducing-chamber, insulation between said reducing-chamber and said molding-chamber and means for heating said molding-chamber, substantially as and for the purpose described.

2. In apparatus for molding frozen products, a plurality of layer-forming chambers, means for discharging the contents from said layer-forming chambers, a molding-chamber into which said layers are discharged and wherein they are united together by lateral pressure, partitions within said molding-chamber so located as to be interposed between said layers as they enter said molding-chamber and means for heating said partitions so that the adjacent faces of said layers are heated and therefore enabled to firmly unite together under pressure in said molding-chamber, substantially as and for the purpose described.

3. In apparatus for molding frozen products, a plurality of chambers for the reception of said products, a spiral web located in each of said chambers adapted to be rotated and thus discharge the contents thereof, a reducing-chamber communicating with each of said first-named chambers to receive the contents thereof, a common molding-chamber into which all of said reducing-chambers discharge their contents in the form of layers, partitions within said molding-chamber so located as to be interposed between said layers as they enter said molding-chamber and means for heating said partitions so that the adjacent faces of said layers are heated and therefore enabled to unite firmly together under pressure in said molding-chamber, substantially as and for the purpose described.

4. In apparatus for molding frozen products, a chamber, means for introducing the product to be molded into said chamber, a spiral conveyer located within said chamber, means for rotating said conveyer, trailing paddles journaled in the web of said conveyer parallel to the axis thereof and a molding-chamber into which the contents of said first-mentioned chamber are discharged, substantially as described.

Signed at Pittsburg, Pennsylvania, this 10th day of May, 1904.

JOHN J. GLAUSER.

Witnesses:
SUZANNE S. BEATTY,
EDWARD A. LAWRENCE.